(12) United States Patent
Fernandez Garcia et al.

(10) Patent No.: US 10,127,935 B2
(45) Date of Patent: Nov. 13, 2018

(54) PLASMONIC GAP WAVEGUIDE

(71) Applicant: Seagate Technology LLC, Cupertino, CA (US)

(72) Inventors: Roberto Fernandez Garcia, Derry (GB); Andres David Barbosa Neira, Derry (GB); Michael James Hardy, Londonderry (GB); Mark Anthony Gubbins, Donegal (IE)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/784,479

(22) Filed: Oct. 16, 2017

(65) Prior Publication Data

US 2018/0108373 A1    Apr. 19, 2018

Related U.S. Application Data

(60) Provisional application No. 62/408,909, filed on Oct. 17, 2016.

(51) Int. Cl.
| | |
|---|---|
| *G11B 5/02* | (2006.01) |
| *G11B 5/48* | (2006.01) |
| *G02B 6/122* | (2006.01) |
| *G11B 13/08* | (2006.01) |

(Continued)

(52) U.S. Cl.
CPC .......... *G11B 5/4826* (2013.01); *G02B 6/1226* (2013.01); *G02B 6/1228* (2013.01); *G11B 13/08* (2013.01); *G02B 2006/12135* (2013.01); *G11B 2005/0021* (2013.01)

(58) Field of Classification Search
CPC ....... G11B 13/04; G11B 7/124; G11B 7/1387; G11B 11/1058; G11B 11/24; G11B 13/08; G11B 7/24059; G11B 9/12; G11B 2005/0024; G11B 5/3116; G11B 5/40; G11B 7/1395; G11B 5/6088
USPC .... 360/59, 313, 318, 328; 369/13.13, 13.33, 369/13.34
See application file for complete search history.

(56) References Cited

U.S. PATENT DOCUMENTS

| | | | |
|---|---|---|---|
| 8,098,547 B2* | 1/2012 | Komura ................ | B82Y 20/00 360/59 |
| 8,264,919 B2* | 9/2012 | Komura ................ | B82Y 20/00 369/13.13 |

(Continued)

*Primary Examiner* — Nabil Hindi
(74) *Attorney, Agent, or Firm* — Hollingsworth Davis, LLC

(57) ABSTRACT

An apparatus includes a slider configured for heat-assisted magnetic recording. An input coupler of the slider is configured to-receive light produced by a light source. A waveguide of the slider comprises a waveguide core tapering from a first portion having a first cross sectional width to a second portion having a second cross sectional width along the light propagation direction. The second cross sectional width being smaller than the first cross sectional width, and the second portion having an output end. The waveguide includes at least one cladding layer comprising a metallic material. The at least one cladding layer surrounds at least the core. The at least one cladding layer is configured to sink heat away from the waveguide core. The waveguide is configured to provide a surface plasmon-enhanced near-field radiation pattern proximate the output end in response to the light received at the transducer region.

20 Claims, 13 Drawing Sheets

(51) Int. Cl.
 *G02B 6/12* (2006.01)
 *G11B 5/00* (2006.01)

(56) References Cited

U.S. PATENT DOCUMENTS

| | | |
|---|---|---|
| 8,437,230 B2 * | 5/2013 | Aoki .................. G11B 5/314 |
| | | 369/112.27 |
| 8,451,705 B2 | 5/2013 | Peng et al. |
| 9,099,130 B2 | 8/2015 | Gubbins et al. |
| 9,230,582 B2 | 1/2016 | Itagi et al. |
| 2013/0223196 A1 * | 8/2013 | Gao .................. G11B 5/6088 |
| | | 369/13.24 |

\* cited by examiner

PLASMONIC GAP WAVEGUIDE

RELATED PATENT DOCUMENTS

This application claims the benefit of Provisional Patent Application No. 62/408,909 filed on Oct. 17, 2016, which is incorporated herein by reference in its entirety.

SUMMARY

Embodiments are directed to an apparatus comprising a slider configured for heat-assisted magnetic recording. An input coupler of the slider is configured to-receive light produced by a light source. A waveguide of the slider comprises a waveguide core tapering from a first portion having a first cross sectional width to a second portion having a second cross sectional width along the light propagation direction. The second cross sectional width being smaller than the first cross sectional width, and the second portion having an output end. The waveguide includes at least one cladding layer surrounding at least the core. The waveguide is configured to provide a surface plasmon-enhanced near-field radiation pattern proximate the output end in response to the light received at the transducer region.

Embodiments are directed to an apparatus comprising a slider configured for heat-assisted magnetic recording. The slider comprises an input coupler configured to receive light excited by a light source. The slider comprises a waveguide comprising a first portion extending from the input coupler, the first portion having a substantially constant first cross-sectional width. The waveguide comprises a second portion extending from the first portion, the second portion tapering along a light propagation direction from the first cross-sectional width to a second cross-sectional width, the second cross sectional width being smaller than the first cross sectional width. The waveguide comprises a third portion extending from the second portion, the third portion having the second cross-sectional width that remains substantially constant along the light propagation direction, the third portion having an output end. The waveguide comprises at least one cladding layer surrounding the first portion, the second portion, and the third portion. The waveguide is configured to provide a surface plasmon-enhanced near-field radiation pattern proximate the output end in response to the light received at the transducer region.

A method comprises delivering light to a transducer region of a heat-assisted magnetic recording slider via a waveguide. Light is received at a plasmonic transducer region of a waveguide. The waveguide includes a waveguide core tapering from a first portion having a first cross sectional width to a second portion having a second cross sectional width along the light propagation direction, the second width being smaller than the first width. The waveguide includes at least one cladding layer surrounding at least the core. A surface plasmon-enhanced near-field radiation pattern is provided proximate the output end of the waveguide in response to receiving the light.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure is generally directed to read-write heads used in magnetic recording devices such as hard drives. In particular, this disclosure relates to heat-assisted magnetic recording (HAMR), which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider will also generally include a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region exceeding the Curie temperature having dimensions less than 100 nm.

Figure 1:
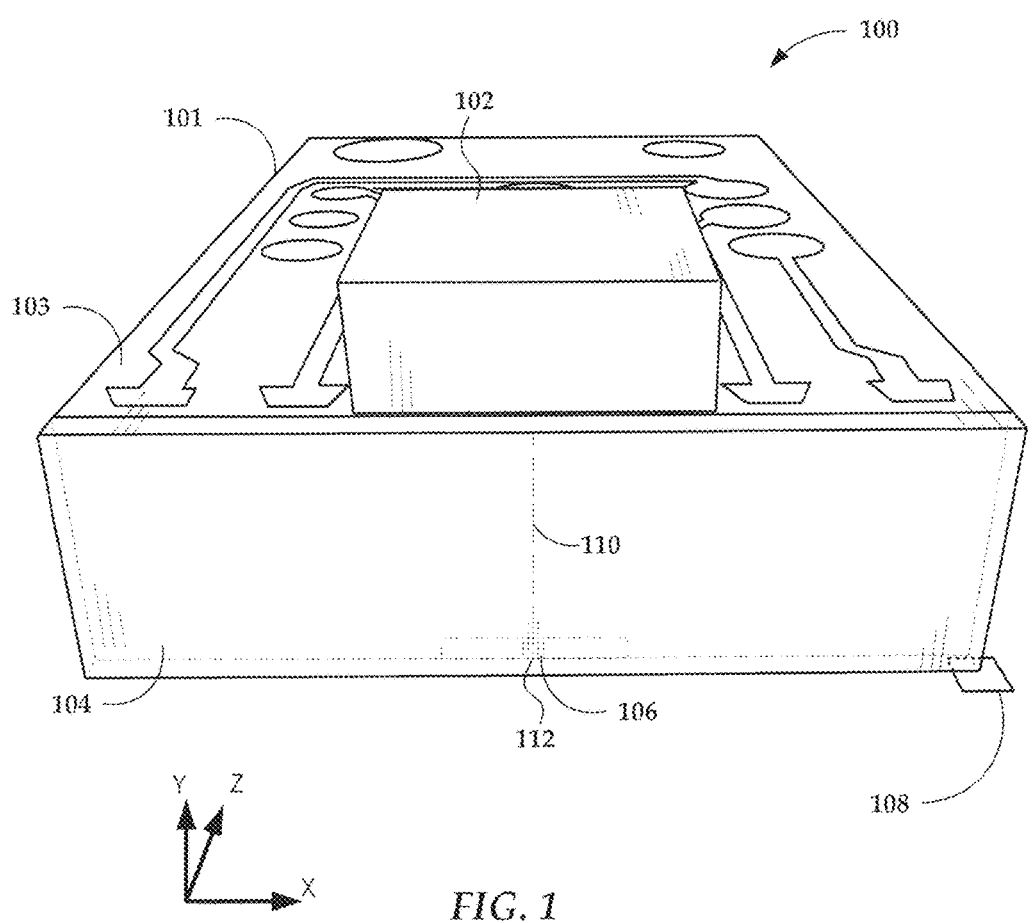
FIG. 1 is a perspective view of a hard drive slider that includes a waveguide in accordance with embodiments described herein.

In reference to FIG. 1, a perspective view shows a HAMR slider assembly 100 according to an example embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, such as a mode converting waveguide system 110, may be formed integrally within the slider body 101 (near a trailing edge surface 104 in this example) and function as an optical path that delivers energy from the laser diode 102 to the recording media via a near-field transducer 112. The near-field transducer 112 is near the read/write head 106 and causes heating of the media during recording operations. In some cases, the waveguide core is configured to function as the NFT.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
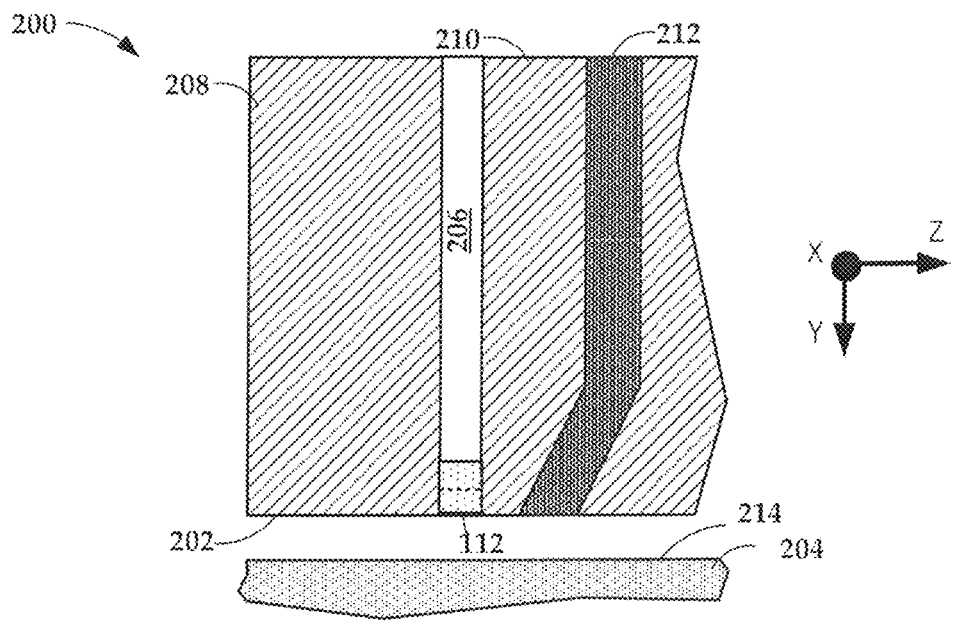
FIG. 2 is a cross-sectional view shows details of a HAMR apparatus according to various implementations.

In reference now to FIG. 2, a cross-sectional view shows details of a HAMR apparatus 200 according to an example embodiment. NFT 112 is located proximate a media-facing surface 202 (e.g., ABS), which is held near a magnetic recording media 204 during device operation. In the orientation of FIG. 2, the media-facing surface 202 is arranged parallel to the x-z plane. A waveguide core 206 may be disposed proximate the NFT 112, which is located at or near the media writing surface 214.

An NFT is any known plasmonic material (e.g., Au, Ag, Cu) and may be positioned at or near a focal region to further direct the energy to the air-bearing surface 110 (ABS). In some configurations, the NFT may be may be configured as a single piece of plasmonic material shaped like a tapered pin or circular disk with a peg attached (e.g., shaped like a lollipop). Such an NFT design may have one end that extend downwards (in the y-direction) to the ABS 110. Electric fields are excited on the surface of the NFT, and these fields are directed out to the air bearing surface 110 for delivery to the media 204. A magnetic pole (e.g., pole 202 in FIG. 2) is positioned proximate the NFT (e.g., above or below the NFT in the z-direction) and applies magnetic fields to the heated media (e.g., media 204 in FIG. 2) during recording.

The waveguide core 206 surrounded by cladding layers 208, 210. The waveguide core 206 and cladding layers 208, 210 may be made from dielectric materials such as $Al_2O_3$, $SiO_xN_y$, $SiO_2$, $Ta_2O_5$, $TiO_2$, ZnS, $SiN_x$, $Nb_2O_5$, AlN, $Hf_2O_3$, $Y_2O_3$, AlO, etc. Generally, the dielectric materials are selected so that the refractive index of the waveguide core layer 206 is higher than refractive indices of the cladding layers 208, 210. This arrangement of materials facilitates efficient propagation of light through the waveguide. Light is delivered from the waveguide core 206 along the negative y-direction where it is coupled to the NFT 112. The NFT 112 delivers surface plasmon enhanced, near-field electromagnetic energy along the y-axis where it exits at the media writing surface. This may result in a highly localized hot spot (not shown) on the media surface when the media 204 placed in close proximity to surface of the apparatus.

In order to alleviate negative effects of high temperatures, an NFT can be thermally coupled to the magnetic pole via a heat sink. Even with the heat sink, however, temperatures induced during recording may be high enough to cause material diffusion between the NFT, pole, and heat sink. This reduces NFT efficiency and also reduces the magnetic moment of the recording pole.

In some cases, the NFT 112 is a part of the waveguide core 106. In this embodiment, the waveguide may function as a waveguide and an NFT. This type of waveguide may be referred to herein as a "plasmonic gap waveguide," a "gap waveguide," and/or an "aperture waveguide." The gap waveguide may be embedded in a cladding material that allows the waveguide to operate as a heat sink and an NFT. This allows the gap waveguide to sink heat away from the waveguide core. For example, the gap waveguide may be embedded in a material having a high thermal conductivity such as Au and/or Cu. In some cases, Au may be used because it has one of the highest levels of thermal conductivity and plasmonic quality factor. This configuration may allow for higher localized electric fields that would be translated into smaller thermal spots with higher thermal gradients than in a system having a peg-based NFT. The gap waveguide system may also allow the device to effectively operate at lower temperatures than a system that has a peg-based NFT.

The plasmonic gap waveguide is based on the optical coupling between two surface plasmon polaritons (SPPs) that propagates in each of the interfaces between the waveguide core and the cladding layers. The plasmonic gap waveguide may be excited by injecting an electric TM and/or TE mode into the waveguide. The reduction of the width and gap separation between the layers can be adjusted to shape the thermal spot size and the thermal gradient in the magnetic recording media.

According to various embodiments, a plasmonic gap waveguide comprises a dielectric core placed between two separated metallic stripes forming a metallic-dielectric-metallic sandwich where the two SPPs propagating in the interfaces dielectric-metal are coupled confining the electric field around the gap. In some cases, the plasmonic gap waveguide has a taper than narrows as it approaches the media-facing surface of the slider. The tapered waveguide may be embedded in a cladding material such as Au. The mode is excited by injecting a TM mode in a wider waveguide that is progressively tapered in order to couple the two SPPs modes into the gap waveguide. The electric field generated at plasmonic-gap waveguide output is used as a heat source to generate a sharp and highly localized thermal spot in the magnetic media.

Figure 3:
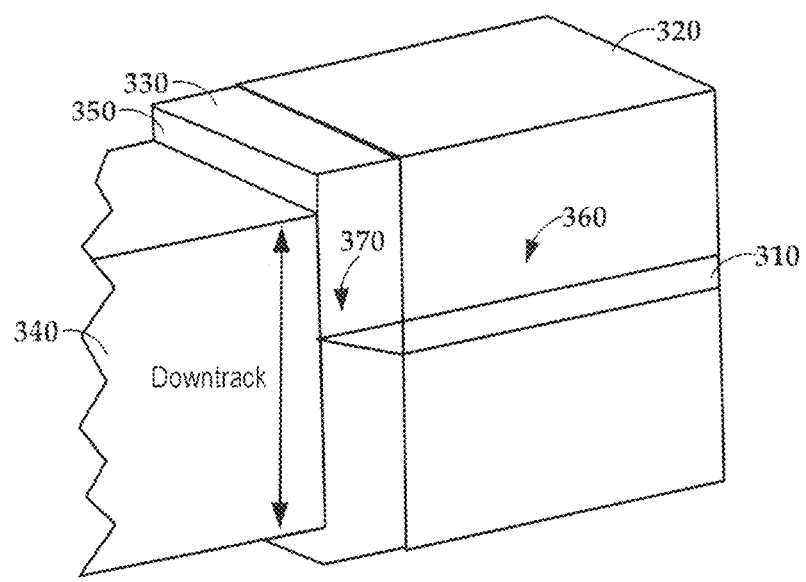
FIG. 3 illustrates a plasmonic gap waveguide that has a narrowing taper as it approaches the ABS according to various embodiments.

FIG. 3 illustrates a plasmonic gap waveguide that has a narrowing taper as it approaches the ABS. The waveguide core 310 may have a substantially constant cross sectional width in a first section closer to the light source. According to various embodiments, the waveguide core 310 is a dielectric such as $Ta_2O_5$, for example. The waveguide core 310 may begin to taper in a second section and continue to taper until it reaches the ABS 350 proximate the media 340. In some cases, the waveguide core 310 may stop tapering at a point before the ABS 350. The waveguide core 310 is surrounded by one or more cladding layers 320, 330 that may have a different index of refraction than the material of the waveguide core 310. For example, the index of refraction of the waveguide core 310 may be less than the index of refraction of at least one of the cladding layers 320, 330. According to various implementations, a first cladding layer 320 is used to surround the first portion 360 of the waveguide core 310. A second cladding layer 330 may be used to surround the second portion 370 of the waveguide core 310. The material used for the first cladding layer 320 may have the same or different index of refraction than the material used for the second cladding layer 330 and/or the waveguide core 310. According to some embodiments, the second cladding layer 330 comprises Au. In some case, the second cladding layer 330 starts at substantially the same point in which the waveguide core 310 starts to taper toward to ABS 350.

Figure 4A:
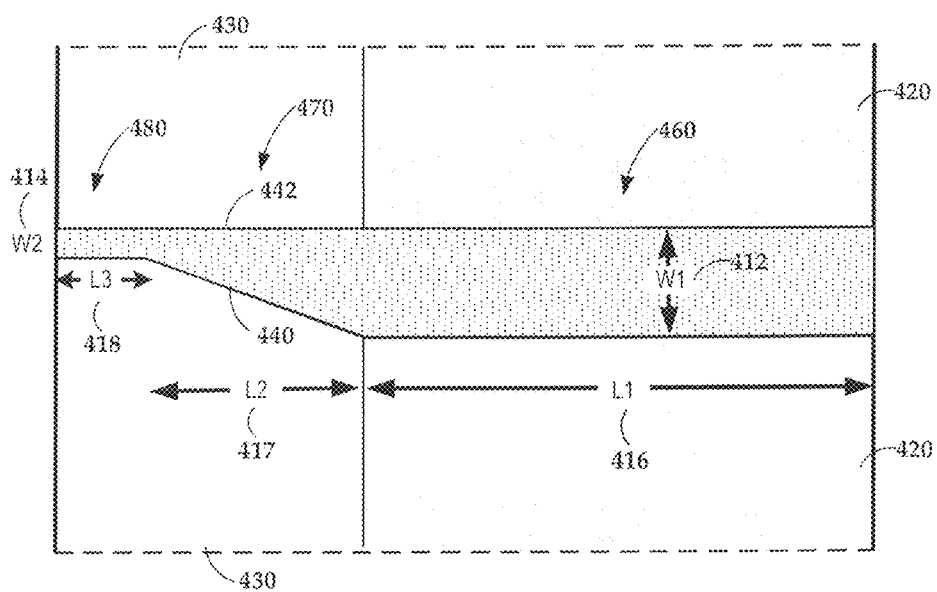
FIG. 4A illustrates a more detailed view of a cross section of the plasmonic gap waveguide in accordance with some aspects.

FIG. 4A illustrates a more detailed view of a cross section of the plasmonic gap waveguide in accordance with various embodiments. The plasmonic gap waveguide has a first portion 460 having a length L1 416. In some cases, the first portion 460 has a constant cross-sectional width W1 412. For example, W1 may be in the range of 350-400 nm. The first portion 460 may be surrounded by a first cladding layer 420. The first cladding layer 420 may comprise $SiO_2$, for example.

The plasmonic gap waveguide has a second portion 470 having a length L2 417 of a range of about 600-900 nm. The second portion 470 may be tapered at least on a first side 440 of the gap waveguide as shown in FIG. 4A. The second opposing side 442 of the gap waveguide may be substantially straight. The second portion 470 tapers to a second width W2 414 in a third portion 480 of the gap waveguide. W2 414 may be in the range of 15-40 nm, for example.

The third portion 480 of the gap waveguide may have a constant cross sectional width as shown in FIG. 4A and may have a length, L3, 418 in the range of 5-70 nm. According to various implementations, the magnitude of L3 418 depends on a targeted track width. The second 470 and the third portions 480 are surrounded by a second cladding layer 430 that may be the same material or a different material than the material of the first cladding layer 420. In some cases, the second cladding layer comprises Au. While FIG. 4A shows the demarcation between the first and second cladding layers 420, 430 being aligned with the first 460 and second 470 portions of the waveguide, it is to be understood that the first cladding layer 420 may extend into the second 470 and/or third portions 480 of the gap waveguide. Similarly, the second cladding layer 430 may extend to surround at least a portion of the first portion 460 of the gap waveguide. In some cases, a third cladding layer having the same or different material from the first and/or second cladding layer may surround at least a portion of the third portion 480 of the gap waveguide.

Figure 4B:
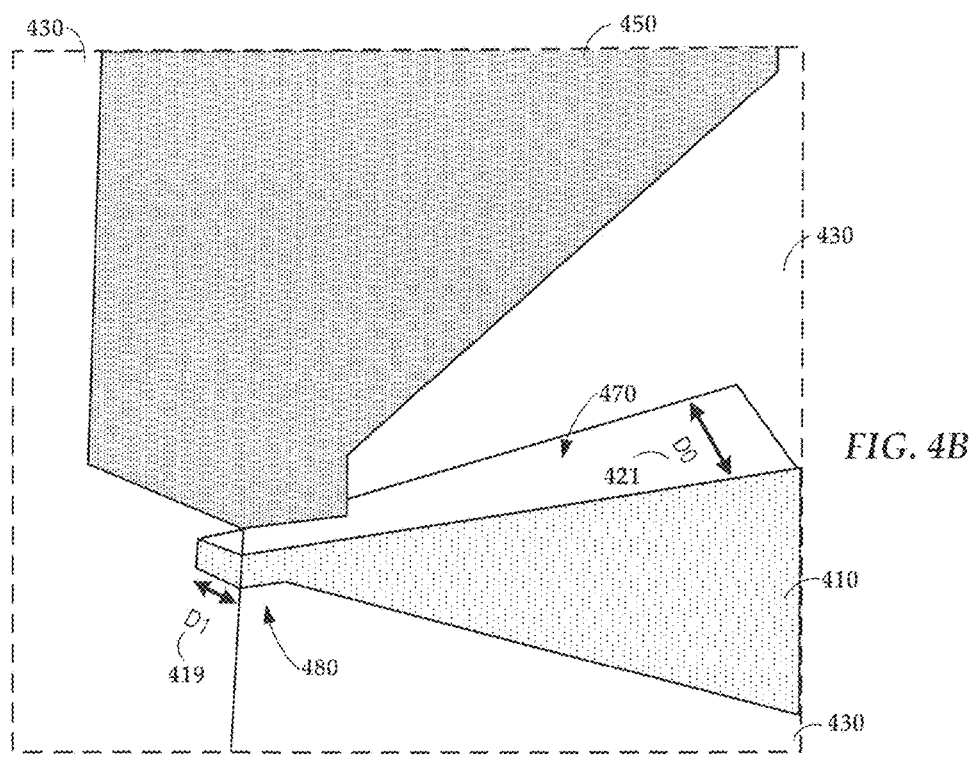
FIG. 4B shows a more detailed view of the second and third portions of the gap waveguide according to various embodiments.

FIG. 4B shows a more detailed view of the second 470 and third portions 480 of the gap waveguide. The gap waveguide may have a constant depth along the light propagation direction. In some cases, the depth of the gap waveguide also tapers as it approaches the ABS. For example, the gap waveguide may have a depth, D0, 421 of about 450-550 nm at the first portion 470 of the gap waveguide and may taper to depth, D1, 419 of about 20-120 nm or about 30 nm at the ABS end of the gap waveguide. The magnitude of D1 419 may depend on several factors. For example, D1 419 may increase as a targeted track width increases. In some cases, D1 419 varies depending on resulting thermal gradients in the cross-track direction and/or the downtrack direction.

Figure 5A:
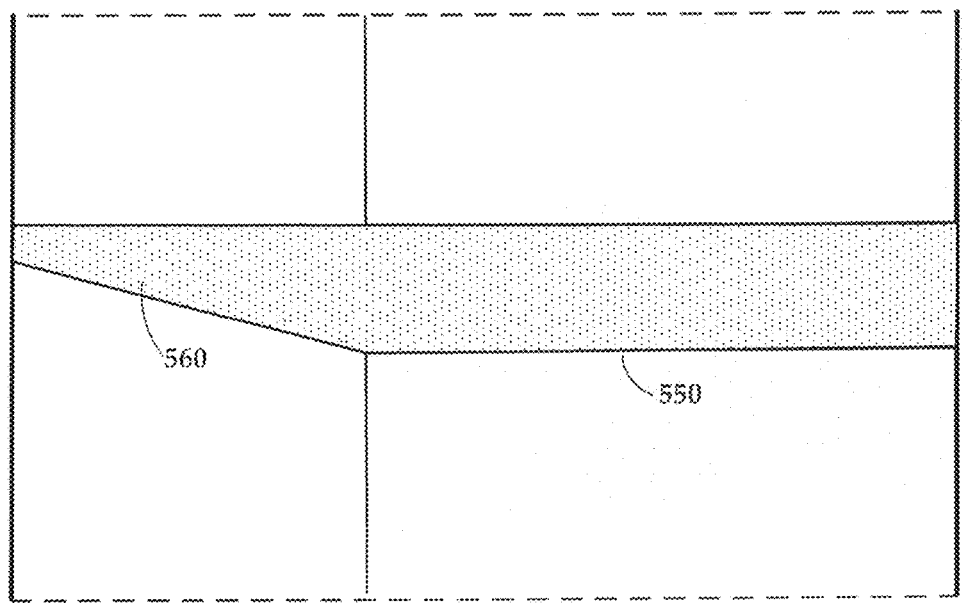
FIGS. 5A-5D illustrate different taper configurations in accordance with embodiments described herein.
Figure 5B:
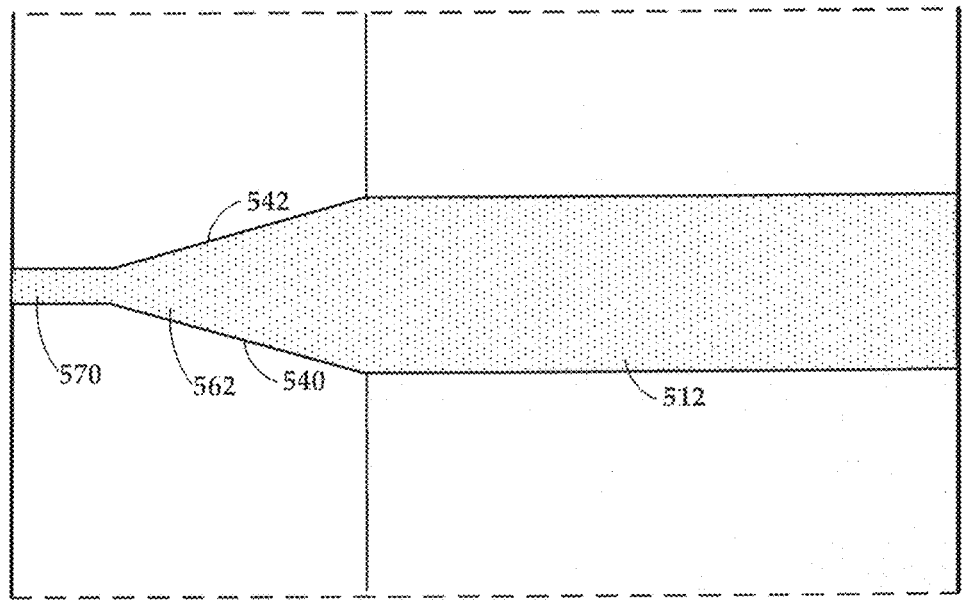
Figure 5C:
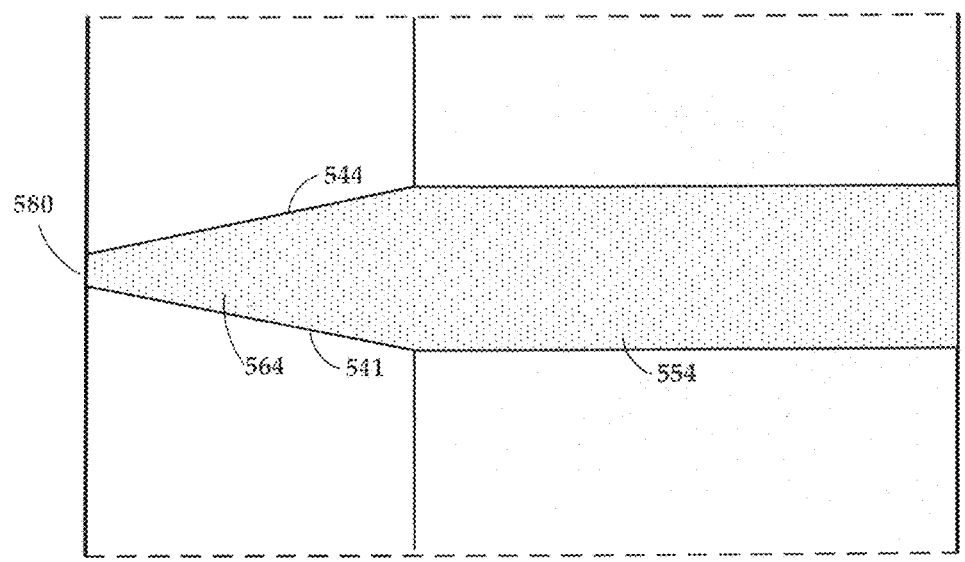

FIGS. 5A-5D illustrate different taper configurations. While the example shown in FIGS. 4A and 4B illustrates a gap waveguide with two sections having a substantially constant cross sectional width, in some cases, the gap waveguide may not include a third portion and may have a taper that decreases continuously until the ABS surface of the gap waveguide is reached. For example, FIG. 5A illustrates an example embodiment in which the gap waveguide includes a first portion 550 having a substantially constant cross sectional width and a second portion 560 that has a taper that tapers to a second cross sectional width at the ABS. FIG. 5B shows an example in which the first side 540 and second side 542 of the gap waveguide have a taper in the second portion 562 of the gap waveguide. In the example shown in FIG. 5B, the first portion 512 of the gap waveguide has a substantially constant cross sectional width and the second portion 562 of the gap waveguide narrows on both sides 540, 542 from the width of the first portion 512 to the width of the third portion 570 of the gap waveguide. The third portion 570 may have a substantially constant cross sectional width. FIG. 5C shows an example in which the first portion 554 has a constant cross sectional width and the second portion 564 tapers on both the first side 541 and the second side 544 up to the air bearing surface 580.

Figure 5D:
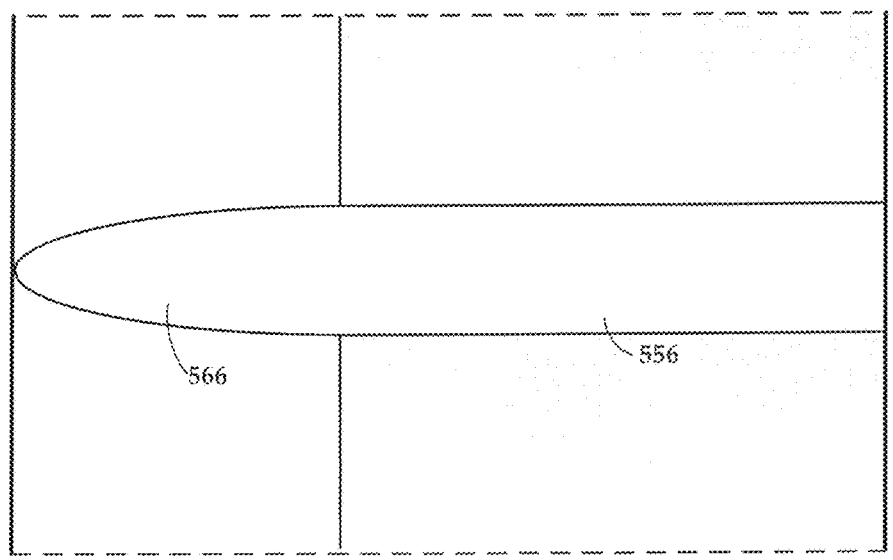

In some cases, one or more of the first side and the second side of the gap waveguide has a curved taper. FIG. 5D illustrates an example of a plasmonic gap waveguide having a curved taper. A first portion 556 of the plasmonic gap waveguide of FIG. 5D has a substantially constant cross sectional width. The plasmonic gap waveguide has a second portion 566 that includes a curved taper.

Figure 6:
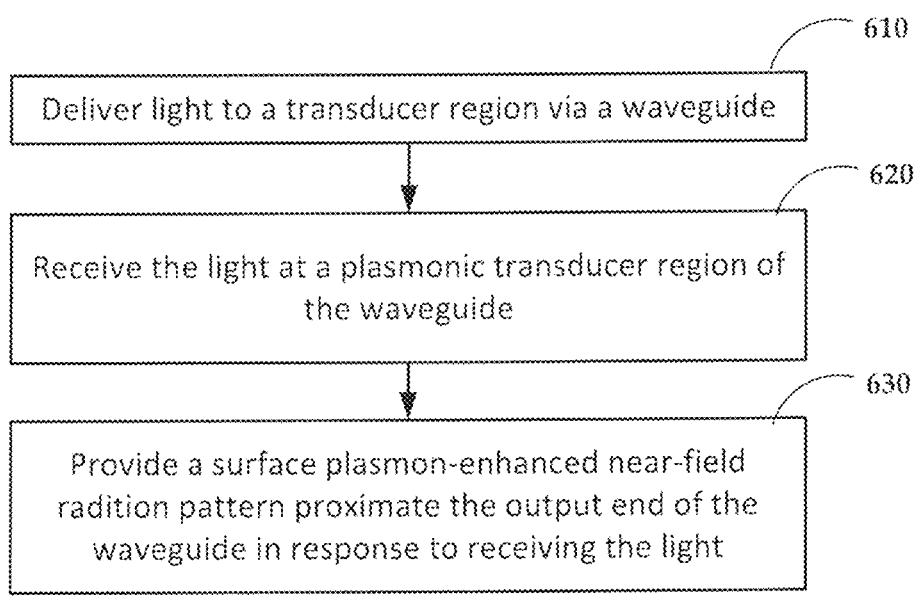
FIG. 6 illustrates a process according to some embodiments.

FIG. 6 illustrates a process in accordance with embodiments described herein. Light is delivered 610 to a transducer region via a waveguide. The light is received 620 at a plasmonic transducer region of a waveguide. According to various embodiments, the waveguide includes a waveguide core tapering from a first portion having a first cross sectional width to a second portion having a second cross sectional width along the light propagation direction. In some cases, the second width is smaller than the first width. The waveguide comprises at least one cladding layer surrounding at least the core. A surface plasmon-enhanced near-field radiation pattern is provided 630 proximate the output end of the waveguide in response to receiving the light.

Figure 7:
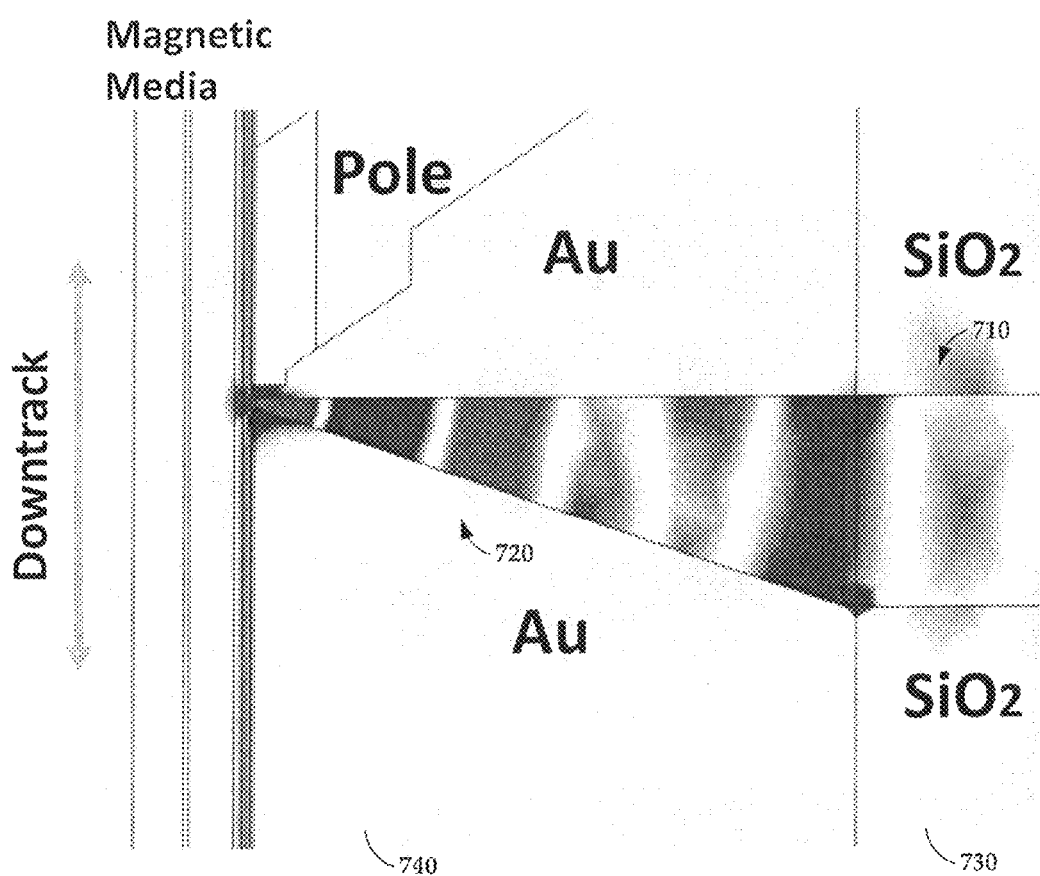
FIG. 7 shows the electric field distribution profile along a cross section of the gap waveguide according to various implementations.

FIG. 7 shows the electric field distribution profile along a cross section of the gap waveguide. The field in the first portion 710 of the plasmonic gap waveguide extends into the first cladding layer 730. The field in the second 720 and, optionally, third portion of the plasmonic gap waveguide is largely confined within the waveguide core and has limited extension into the surrounding second cladding layer 740.

Figure 8A:
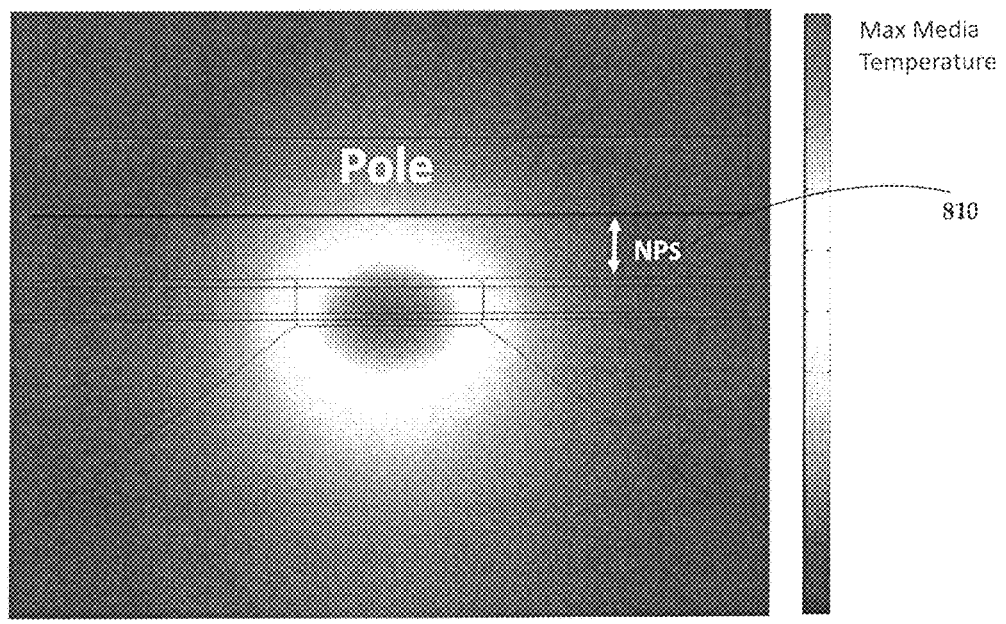
FIGS. 8A and 8B illustrate temperature distribution profiles for a gap waveguide according to various embodiments described herein.

The plasmonic gap waveguide is configured to confine the electric field around the gap. FIG. 8A shows a temperature profile for a gap-based design at the recording layer around the thermal hot spot of a configuration having an NFT pole spacing (NPS) 810 of about 40 nm. The temperature distribution extends along the recording layer plane as shown in FIG. 8A. In this example, the plasmonic gap waveguide is injected with TM mode light and has a TaOx core and $SiO_2$ cladding.

Figure 8B:
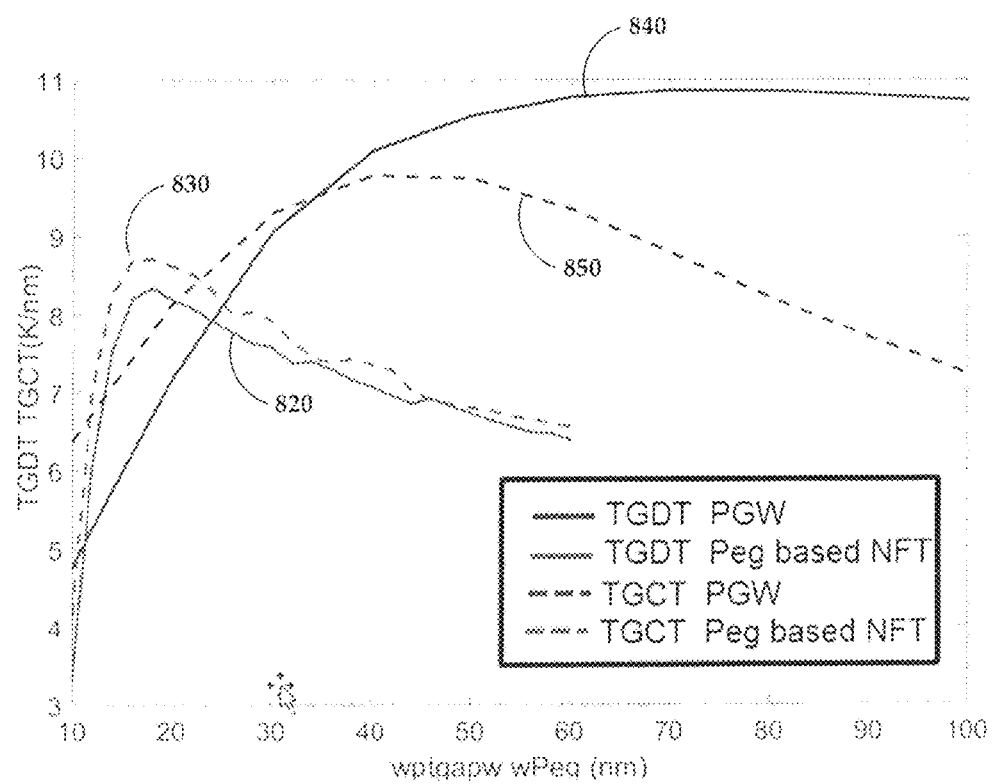

FIG. 8B shows the thermal gradient comparison between this the gap-based model and a peg-based design. The width of the output gap (wptgapw) and the peg width (wPeg) is varied respectively. This example shows the down-track thermal gradient (TGDT) for the peg-based NFT-based design 820, the cross-track thermal gradient (TGCT) for the peg-based NFT-based design 830, the down-track thermal gradient (TGDT) for the plasmonic gap waveguide design 840, and the cross-track thermal gradient (TGCT) for the gap waveguide design 850. In this example, it is observed that with a plasmonic gap waveguide configuration, higher gradients are obtained using larger gap widths (about 40-70 nm) than the width of the peg in a peg-based NFT embodiment which have a peak at about 15-20 nm.

Figure 9A:
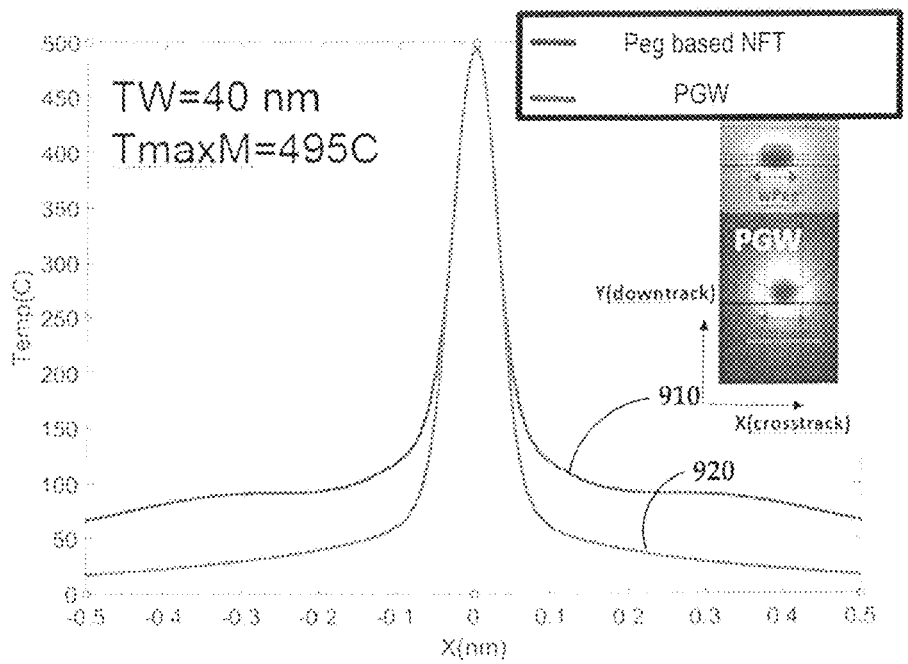
FIG. 9A illustrates the temperature versus the spatial profile distribution for a configuration utilizing a gap waveguide and a peg-based NFT in accordance with some implementations.

FIG. 9A illustrates the temperature versus the crosstrack direction for a configuration utilizing a gap waveguide 920 and a peg-based NFT 910. In this example, the system has a fixed track width of 40 nm and a maximum media temperature of 495 degrees Celsius. The temperature distribution along the crosstrack direction for the gap waveguide design 920 shows a smaller temperature surrounding the hot spot in comparison with a peg-based NFT design 910.

Figure 9B:
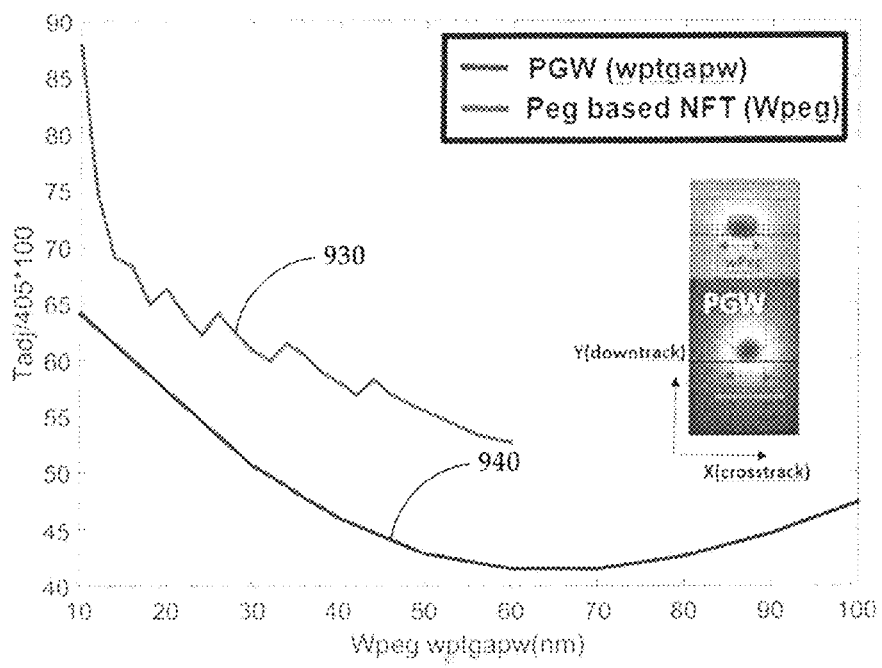
FIG. 9B shows the temperature of an adjacent track normalized to the recording temperature of 405 degrees Celsius versus the width of the gap in the gap waveguide configuration and the width of the peg in a peg-based NFT configuration in accordance with embodiments described herein.

FIG. 9B shows the temperature of an adjacent track normalized to the recording temperature of 405 degrees Celsius versus the width of the gap in the gap waveguide configuration and the width of the peg in a peg-based NFT configuration. As can be observed from FIG. 9B, the temperature of an adjacent track is generally higher for a peg-based NFT configuration 930 having a set width than the temperature of an adjacent track for the same width of the gap for a plasmonic gap waveguide configuration 940. A higher adjacent track width while recording may cause interactions with the adjacent track. Decreasing the interaction with adjacent tracks could lead to being able to increase the number of tracks per inch and thus increase capacity of the physical media.

Figure 10:
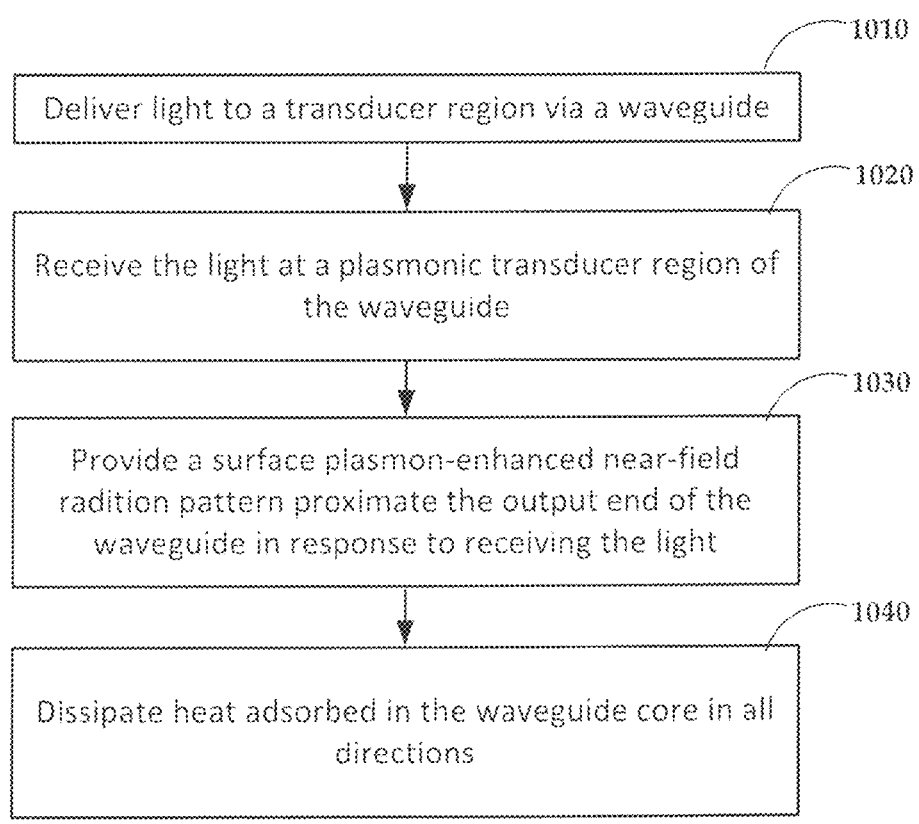
FIG. 10 illustrates a process for using a plasmonic gap waveguide configured to dissipate heat from the waveguide core according to some embodiments.
Figure 11A:
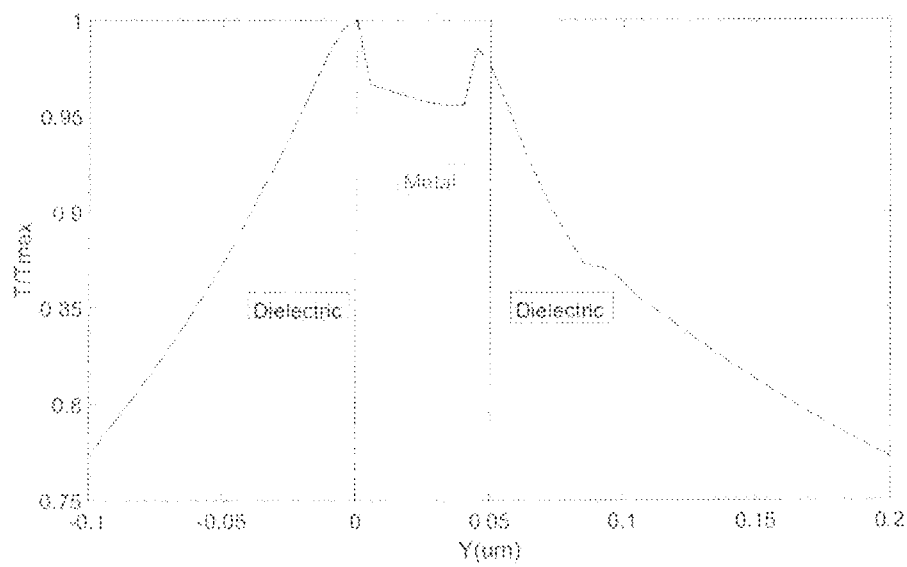
FIGS. 11A and 11B show temperature distributions at the ABS for a peg-based NFT design in accordance with various implementations.
Figure 11B:
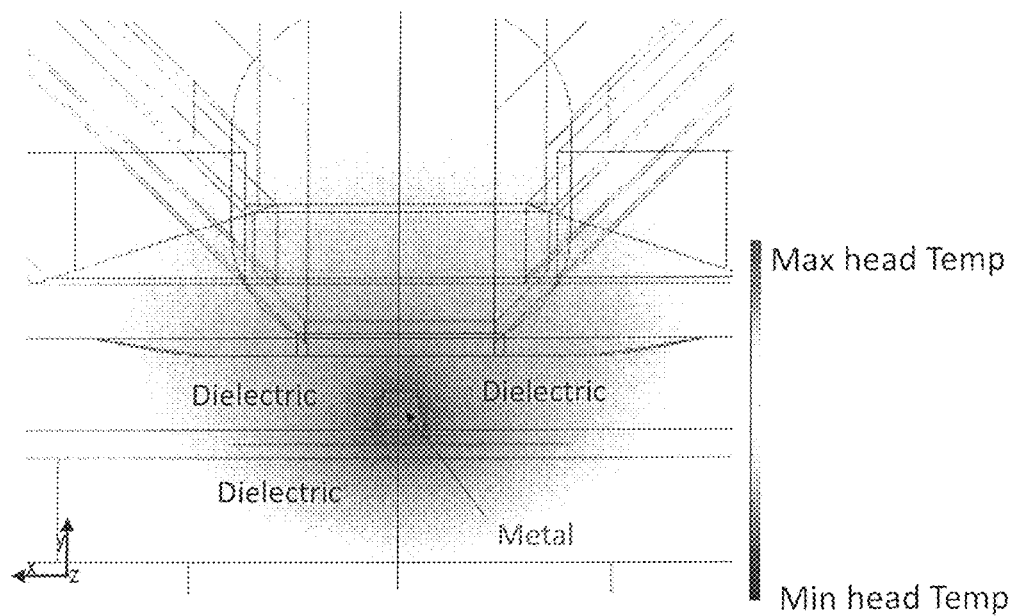
Figure 11C:
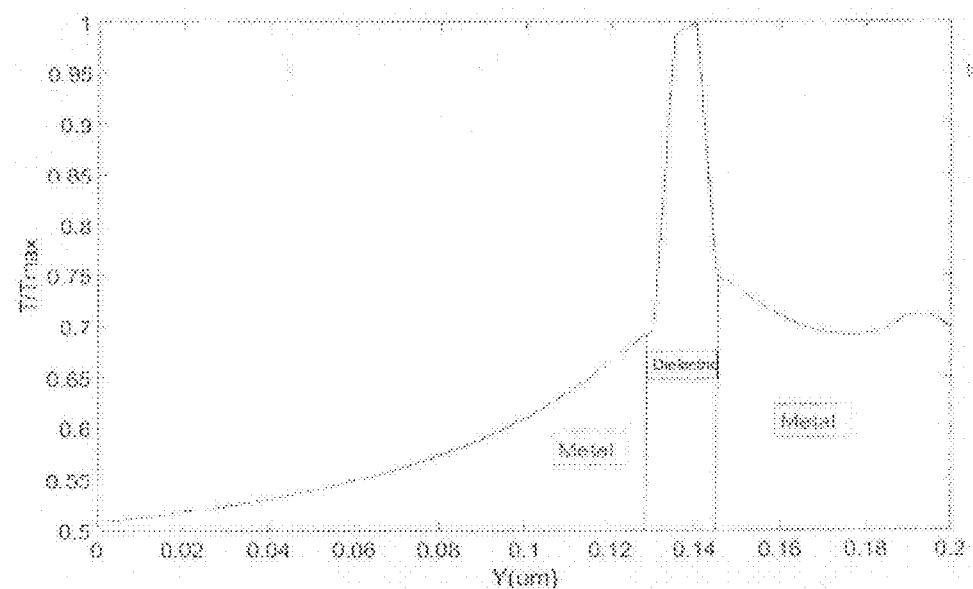
FIGS. 11C and 11D illustrate temperature distributions at the ABS for a gap waveguide design according to some embodiments.
Figure 11D:
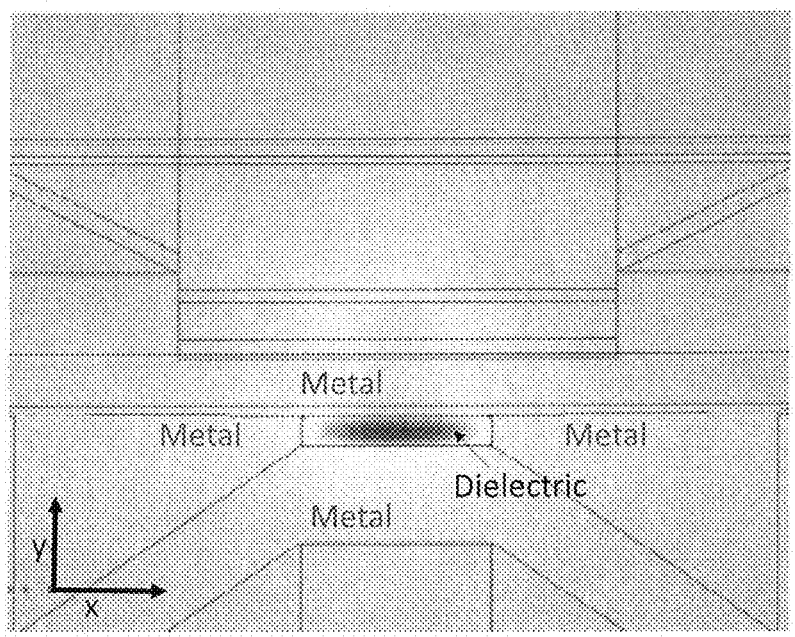

According to various implementations, the plasmonic gap waveguide is configured to dissipate heat from the waveguide core while keeping the temperature in the metallic portions of the waveguide low. This allows for increased life of the device as metal is more likely to deform at high temperatures than a dielectric. FIG. 10 illustrates a process in accordance with embodiments described herein. Light is delivered 1010 to a transducer region via a waveguide. The light is received 1020 at a plasmonic transducer region of a waveguide. According to various embodiments, the waveguide includes a waveguide core tapering from a first portion having a first cross sectional width to a second portion having a second cross sectional width along the light propagation direction. In some cases, the second width is smaller than the first width. The waveguide comprises at least one cladding layer surrounding at least the core. A surface plasmon-enhanced near-field radiation pattern is provided 1030 proximate the output end of the waveguide in response to receiving the light. Heat adsorbed in the waveguide core is dissipated 1040 in all directions. According to various implementations, the heat in the metal portion of the waveguide of the waveguide is kept as low as possible while dissipating heat from the waveguide core. For example, the heat in the cladding layer is kept as low as possible while dissipating heat from the waveguide core.

FIGS. 11A-11D illustrate temperature distributions at the ABS for a peg-based NFT design (FIGS. 11A and 11B) and for a gap waveguide (FIGS. 11C and 11D) having a normalized maximum temperature. For a maximum temperature of head fixed for both cases, a configuration having metal-dielectric-metal structure used in the gap waveguide shows a lower temperature on the metal component in comparison with a dielectric-metal-dielectric configuration used in the peg-based NFT structure. This may be due to the gap waveguide configuration dissipating heat more efficiently because of the high thermal conductivity of the gold cladding. Due to the fact that metal is more likely to be deformed at a high temperature than a dielectric, less heat on the metal portions of the waveguide in a gap waveguide configuration may cause the waveguide to have an longer life than configurations in which there is more heat on the metal portions.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus comprising:
   a slider configured for heat-assisted magnetic recording;
   an input coupler of the slider configured to receive light produced by a light source; and
   a waveguide of the slider comprising:
      a waveguide core tapering from a first portion having a first cross sectional width to a second portion having a second cross sectional width along the light propagation direction, the second cross sectional width being smaller than the first cross sectional width, and the second portion having an output end;
      at least one cladding layer surrounding at least the waveguide core, wherein the waveguide is configured to provide a surface plasmon-enhanced near-field radiation pattern proximate the output end in response to the light received at the transducer region.

2. The apparatus of claim 1, wherein the at least one cladding layer comprises a metallic material.

3. The apparatus of claim 1, wherein the at least one cladding layer comprises Au.

4. The apparatus of claim 1, wherein the waveguide core tapers for a length of about 600-900 nm.

5. The apparatus of claim 1, wherein the waveguide core has a first side and a second side opposing the first side, the first side and the second side extending along the propagation direction and the first side tapers from the first cross sectional width to the second cross sectional width while the second side remains substantially straight from the first cross sectional width to the second cross sectional width.

6. The apparatus of claim 1, wherein the second portion remains at a substantially constant width for a length of about 15-40 nm.

7. The apparatus of claim 1, wherein the at least one cladding layer comprises a first cladding layer that surrounds a first portion of the waveguide core and a second cladding layer that surrounds a second portion of the waveguide core, wherein at least one of the first and second cladding layers comprises Au.

8. The apparatus of claim 1, wherein the core layer comprises $Ta_2O_5$.

9. The apparatus of claim 1, wherein the waveguide is configured to sink heat away from the waveguide core.

10. The apparatus of claim 1, wherein light exits the apparatus at an aperture of the output end having the second cross sectional width.

11. An apparatus comprising:
    a slider configured for heat-assisted magnetic recording, the slider comprising:
       an input coupler configured to receive light excited by a light source; and
       a waveguide comprising:
          a first portion extending from the input coupler, the first portion having a substantially constant first cross-sectional width;
          a second portion extending from the first portion, the second portion tapering along a light propagation direction from the first cross-sectional width to a second cross-sectional width, the second cross-sectional width being smaller than the first cross-sectional width;
          a third portion extending from the second portion, the third portion having the second cross-sectional width that remains substantially constant along the light propagation direction, the third portion having an output end; and
          at least one cladding layer surrounding the first portion, the second portion, and the third portion, wherein the waveguide is configured to provide a surface plasmon-enhanced near-field radiation pattern proximate the output end in response to the light received at the transducer region.

12. The apparatus of claim 11, wherein the at least one cladding layer comprises a first cladding layer that surrounds the first portion and a second cladding layer that surrounds the second portion and the third portion.

13. The apparatus of claim 12, wherein the first cladding layer comprises $SiO_2$ and the second cladding layer comprises Au.

14. The apparatus of claim 11, wherein the waveguide core tapers for a length of about 600-900 nm.

15. The apparatus of claim 11, wherein the third portion remains at a substantially constant width for a length of about 15-40 nm.

16. The apparatus of claim 11, wherein the core layer comprises a dielectric material.

17. The apparatus of claim 11, wherein the waveguide is configured to sink heat away from the waveguide core.

18. A method comprising:
    delivering light to a transducer region of a heat-assisted magnetic recording slider via a waveguide;
    receiving the light at a plasmonic transducer region of a waveguide, the waveguide including a waveguide core tapering from a first portion having a first cross sectional width to a second portion having a second cross sectional width along the light propagation direction, the second width being smaller than the first width and at least one cladding layer surrounding at least the core; and
    providing a surface plasmon-enhanced near-field radiation pattern proximate the output end of the waveguide in response to receiving the light.

19. The method of claim 18, further comprising sinking heat away from the waveguide core using the waveguide.

20. The method of claim 18, wherein at least one of the cladding layers comprises Au.

* * * * *